United States Patent [19]
O'Brien et al.

[11] Patent Number: 5,736,798
[45] Date of Patent: Apr. 7, 1998

[54] PASSIVE MAGNETIC DAMPER

[75] Inventors: Michael Joseph O'Brien, Rochester; Robert Cooper Bryant, Honeoye Falls; Richard Alexander Colleluori, Rochester, all of N.Y.

[73] Assignee: Eastman Kodak Company, Rochester, N.Y.

[21] Appl. No.: 681,001

[22] Filed: Jul. 22, 1996

[51] Int. Cl.⁶ .................................................. H02K 7/09
[52] U.S. Cl. .................... 310/51; 310/90.5; 310/103; 310/105
[58] Field of Search .................... 248/562, 636, 248/610; 105/193; 310/90.5, 51, 103, 105, 75 D

[56] References Cited

U.S. PATENT DOCUMENTS

| | | | |
|---|---|---|---|
| 3,881,740 | 5/1975 | Sacerdoti et al. | 308/10 |
| 3,885,504 | 5/1975 | Baermann | 104/148 |
| 4,002,937 | 1/1977 | Anson | 310/168 |
| 4,517,505 | 5/1985 | Cunningham | 318/611 |
| 4,541,772 | 9/1985 | Becker | 415/90 |
| 4,620,752 | 11/1986 | Fremerey et al. | 310/90.5 |
| 5,029,995 | 7/1991 | Weyrauch et al. | 350/500 |
| 5,126,610 | 6/1992 | Fremerey | 310/90.5 |
| 5,140,529 | 8/1992 | Peifer | 364/508 |
| 5,148,313 | 9/1992 | Schwemin | 359/555 |
| 5,396,139 | 3/1995 | Surmely et al. | 310/254 |
| 5,481,146 | 1/1996 | Davey | 310/90.5 |
| 5,495,221 | 2/1996 | Post | 335/229 |

FOREIGN PATENT DOCUMENTS

| | | | |
|---|---|---|---|
| 1-108431 | 4/1989 | Japan | F16F 6/00 |
| 4-254028 | 3/1992 | Japan | F16F 15/03 |
| 5-312229 | 1/1993 | Japan | F16F 6/00 |
| 5-296287 | 2/1993 | Japan | F16F 15/03 |

OTHER PUBLICATIONS

D. Schieber, D.Sc., Sen. Mem. I.E.E.E., "Force On A Moving Conductor Due To A Magnetic Pole Array," pp. 1519 & 1520 from Proc. IEE, vol. 120, No. 12, Dec. 1973.

*Primary Examiner*—Steven L. Stephan
*Assistant Examiner*—Michael J. Wallace, Jr.
*Attorney, Agent, or Firm*—Edward Dugas

[57] ABSTRACT

A disk shaped passive magnetic damper incorporating a damper vane having spaced apart vertical and horizontal portions forming a castellated shape. Permanent magnets are positioned between the vertical portions of the damper vane for providing magnetic fields that interact with the vertical and horizontal portions of the damper vane. A keeper portion extends from one end of each magnet to a position over one adjacent horizontal vane member.

8 Claims, 4 Drawing Sheets

PASSIVE MAGNETIC DAMPER

FIELD OF THE INVENTION

The invention relates generally to the field of eddy current dampers and more specifically to the field of passive limited motion rotary magnetic eddy current dampers.

BACKGROUND OF THE INVENTION

Mechanical damping (applying a force that opposes motion and is proportional to velocity) is a desirable feature of systems in which vibration of a mechanism must be limited or eliminated. A common technique is to employ an eddy current damper consisting of an electrically conductive plate (attached to the member to be damped) which moves within an applied magnetic field. Eddy currents induced in the conductive plate, due to its motion, produce a magnetic field which opposes the applied magnetic field. The produced magnetic field causes a force that opposes the motion of the conductive plate which is proportional to the velocity at which the member moves. Vibration reduction is particularly important in tools used for the precision grinding of optical surfaces. Tools specifically designed for polishing large work pieces have large inertias and low resonant modes. Consequently the low velocity and large force required for adequate damping is difficult to achieve with currently available designs. Passive damping is preferred to active damping since it is fixed and does not interfere with other systems used to control torque, speed, or force.

Eddy current dampers may be either active or passive. Active damping reduces vibration by sensing motion and applying a force to counteract the motion. These systems have a variable damping rate that is not truly proportional to velocity. A classic rotating shaft damper is demonstrated in U.S. Pat. No. 4,517,505, entitled, "Variable Force, Eddy-Current Or Magnetic Damper" by Cunningham, where an electro-magnet varies the eddy current producing field based on the vibrations sensed in the shaft. A similar arrangement is shown in U.S. Pat. No. 5,140,529, entitled, "Reverse Torque Preload Spindle" by Piefer where the damping is applied to a drum that is in turn attached to a rotating shaft. Velocity feedback is used to control the magnetic field strength to provide a preload drag as well as damping that is proportional to shaft vibration. Passive dampers provide a constant damping factor and are preferred over actively controlled dampers.

Examples of passive eddy current damping can be found in many collage physics text books. A paper entitled, "Force On A Moving Conductor Due To A Magnetic Pole Array" by D. Schieber (Proc. IEE, Vol. 120, No. 12, December 1973) reviews a method of designing passive eddy current dampers with discrete pole pairs. A passive eddy current damper built into the structure of an active magnetic bearing is illustrated in U.S. Pat. No. 4,620,752, entitled, "Magnetic Bearing Having Triaxial Position Stabilization" by Fremerey et. al. Having a fixed degree of damping prevents resonant run away and simplifies shaft position control loops. Numerous other applications make use of eddy currents developed in conducting plates by rotating magnet pairs for damping. Japanese disclosure 05-296287 (Watanabe et. al., 1993) is typical. Japanese disclosure 05-312229 (Ueno, 1993) shows the use of soft iron poles to control the field angle through the plate, providing slight damping in the axial as well as radial direction. Eddy current dampers are often used in limited rotation applications for example see U.S. Pat. No. 5,029,995, entitled, "Telescope Having Image Field Stabilization By Cardanically Journalled Inverting Systems" by Weyrauch et. al., wherein image motion in a telescope is reduced by using a damper on a flexibly mounted optical element within the lens system. A similar arrangement is used to damp the motion of a scanning mirror in U.S. Pat. No. 5,148,313, entitled, "Stabilizer Cell For Inertial Optical Stabilizer" by Schwemin.

Typically to provide damping in multiple directions a separate damper must be provided for each direction. The problem facing the present inventors required the need to dampen in a tip, tilt, axial, and radial mode. To solve this problem, using conventional techniques, would have required up to five separate dampers. The present invention provides the needed damping with a single passive damper having multi-axis capability.

SUMMARY OF THE INVENTION

The present invention is directed to overcoming one or more of the problems set forth above. Briefly summarized, according to one aspect of the present invention, there is provided a passive magnetic damper, comprising:

a damping vane having spaced apart vertical and horizontal portions forming a castlated shape; and a plurality of magnets positioned between the vertical portions of said damping vane for providing magnetic fields for interacting with the vertical and horizontal portions of said damping vane.

The above and other objects of the present invention will become more apparent when taken in conjunction with the following description and drawings wherein identical reference numerals have been used, where possible, to designate identical elements that are common to the figures.

It is an object of the present invention to provide a compact multi-axis passive magnetic damper for limited rotation mechanisms.

It is another object of the present invention to provide a relatively simple damping structure which is easily mounted in a system.

It is a further object of the present invention to provide a means for adjusting the ratio of the damping on each axis by changing vane and pole geometry during the design phase.

The invention consists of a pair of stationary magnet structures positioned on a polisher support structure to form a castellated gap about the main axis of rotation of the polishing head. A castellated damper vane shaped to fit within the gap is attached to the head to be damped. The ratio of damping between axes is determined by the damper vane and pole geometry. The level of damping is determined by the number and position of poles and the gap between magnet structures.

ADVANTAGEOUS EFFECT OF THE INVENTION

The present invention has the following advantages:

1. Five axes of motion can be damped with a single unit.
2. Relatively high damping levels are obtained due to the pole structure.
3. A single castellated damper vane and unique pole structure provide multi-axis damping.
4. The ratio of damping on one axis to another can be adjusted by varying damper vane and pole geometry.
5. The damper vane can be configured to provide damping in selected directions only.

DETAILED DESCRIPTION OF THE INVENTION

Figure 1:
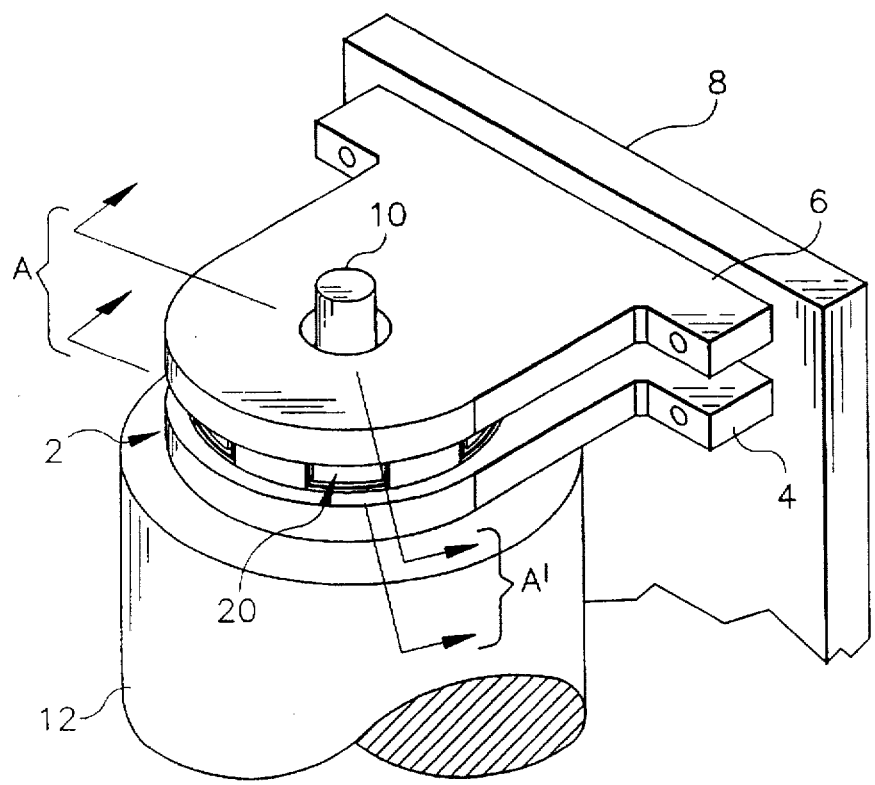
FIG. 1 is a perspective view, partially cut away, of a damped motor assembly illustrating the eddy current damper of the present invention mounted in place on the motor housing.

Referring to FIG. 1, a damper assembly 2 is mounted by a stationary lower magnet assembly mount 4 and a stationary upper magnet assembly mount 6 connected to a polisher head support 8 of an optical lens grinder. The upper and lower magnet assembly mounts 4 and 6 are rigid supports against which the damper elements of the present invention act to generate damping forces. An extension shaft 10 which is concentric with, and fixedly attached to the polisher head 12, supports a damper vane assembly 20. Vibrations of the polisher head 12 produce eddy currents in the damper vane assembly 20 due to the presence of a stationary applied magnetic field generating a reaction force that opposes the vibratory motion.

Figure 2:
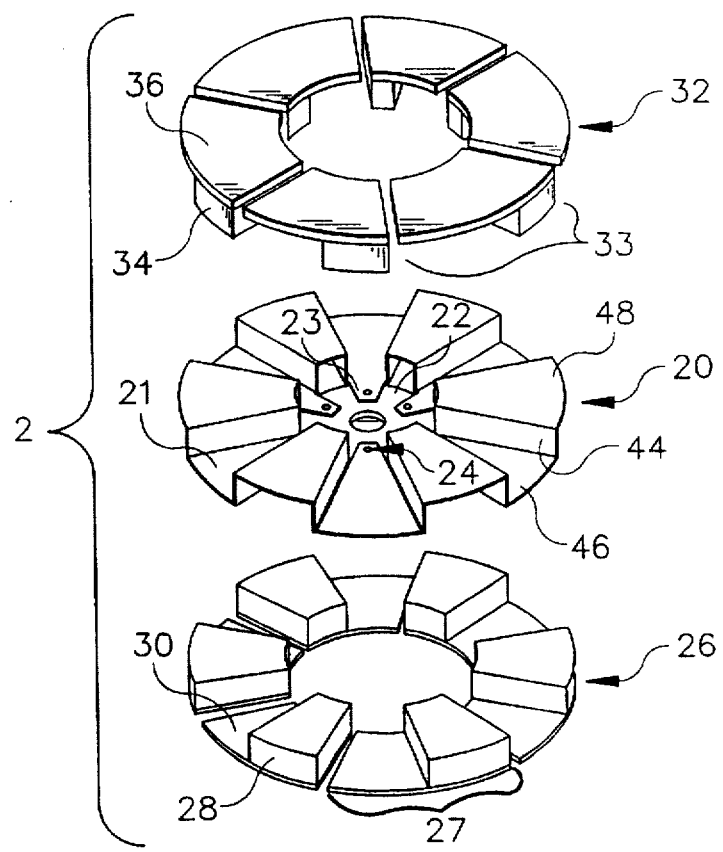
FIG. 2 is an exploded view of the eddy current damping elements removed from the damped motor assembly of FIG. 1.

Referring now to FIG. 2, the applied magnetic field is generated by magnet assemblies 26 and 32 positioned in close proximity on opposite sides of the damper vane assembly 20. The damper vane assembly 20 consists of a damper vane 21, castellated in shape, and a non-magnetic mounting hub 22. The damper vane 21 is formed with vertical vane sections 44 and horizontal vane portions 46 and 48. The damper vane 21 is made of a material with high electrical conductivity such as copper. The damper vane 21 is attached to the non-magnetic mounting hub 22 which secures the damper vane assembly 20 to the polisher head's extension shaft 10. Mounting tabs 23 are provided with holes 24 for securing the damper vane 21 to the mounting hub 22. Any number of standard assembly methods such as screws, rivets, or adhesives may be used. It should also be appreciated that other vane/hub interfaces can be designed that for instance, can support larger forces than the current design. A lower magnet assembly 26 made up of multiple pole assemblies 27 consisting of Neodymium-Iron-Boron (TRI-NEO-32) magnets 28 are bonded onto hydrogen annealed mild steel keepers 30 using Loctite 242 instant adhesive.

All magnets 28 are mounted such that their north poles are against their keepers 30 with each keeper 30 extending clockwise from the magnets 28 when viewed from the top. Similarly, the upper magnet assembly 32 is made up of multiple pole assemblies 33 consisting of magnets 34 and keepers 36. The same materials are employed as those used in the lower magnet assembly 26. In this case the magnets 34 are also mounted with their north poles against their respective keeper, but each keeper in the upper magnet structure extends counter-clockwise if viewed from the magnet side. It should be noted that the keepers must be thick enough to avoid magnetic saturation. Pole assemblies are mounted using epoxy in recesses 37 and 38, provided in the lower and upper magnet assembly mounts 4 and 6, respectively (see FIG. 3).

Figure 3:
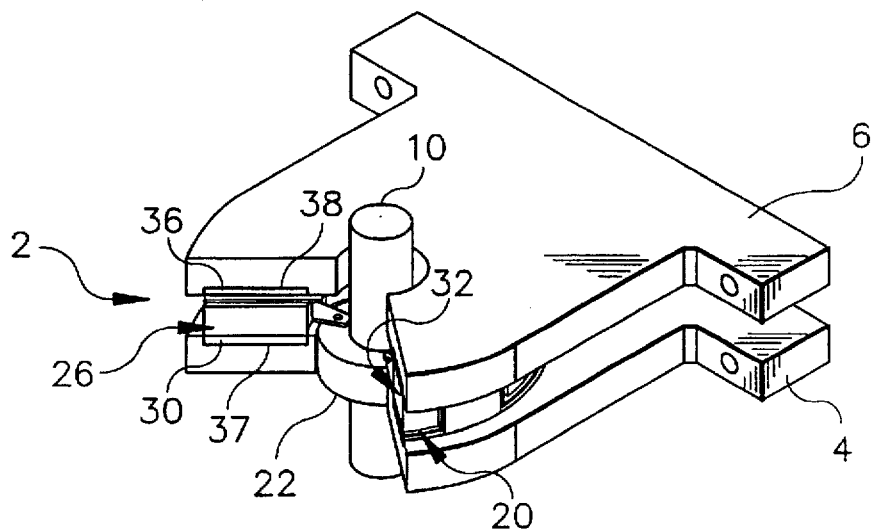
FIG. 3 is a perspective of the upper portion of the damped motor assembly of FIG. 1 having a sectioned cut away portion taken along the plane defined by the lines labeled A—A'.

Referring to FIG. 3, the lower and upper magnet assembly mounts 4 and 6, respectively, position the lower and upper magnet assemblies, 26 and 32, respectively, in position to allow the damper vane assembly 20 to move appropriately between them. The mounting of the damper vane assembly 20 to the mounting hub 22 which in turn is clamped to the polishing head extension shaft 10 is more clearly shown in this figure. For ease of assembly a recess 37 is formed in the lower magnet assembly mount 4 for receiving the lower magnet assembly 26. In a like manner a recess 38 is formed in the upper magnet assembly mount 6 for receiving the upper magnet assembly 32.

Figure 4:
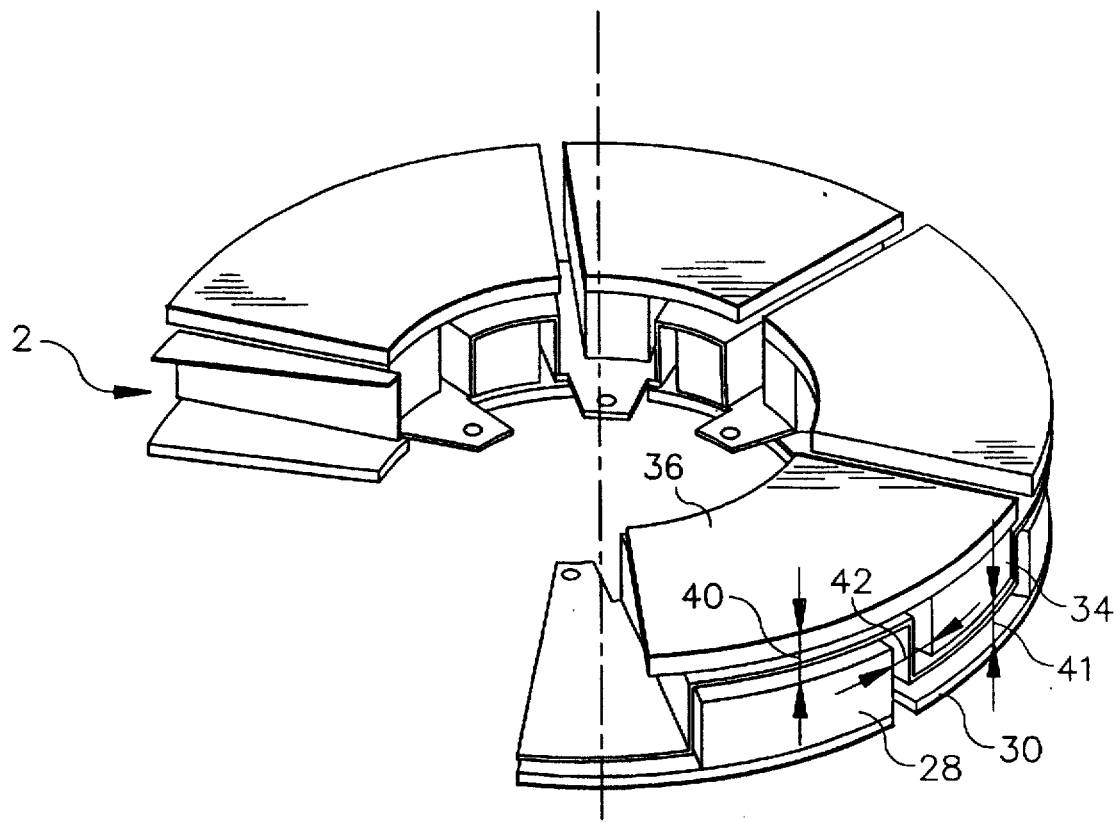
FIG. 4 is a perspective view, partially cut away, of the eddy current damper elements of FIG. 2, assembled outside of the damped motor assembly to clearly illustrate the relative positions of the elements.

FIG. 4 depicts a second view of the damper assembly 2. Horizontal gaps 40 and 41, between magnets 28 and keepers 36, and the vertical gap 42, between the magnets 28 and 34, must be as small as possible to maximize damping, yet large enough to accommodate the maximum expected displacement of the damper vane assembly 20. Ideally, the gaps 40, 41, and 42 should be of equal size; however, it is possible to vary the ratio of the gaps to obtain a desired ratio of damping for each damping direction. Large differences in the gap dimensions will significantly change the equations for determining damping.

Figure 5:
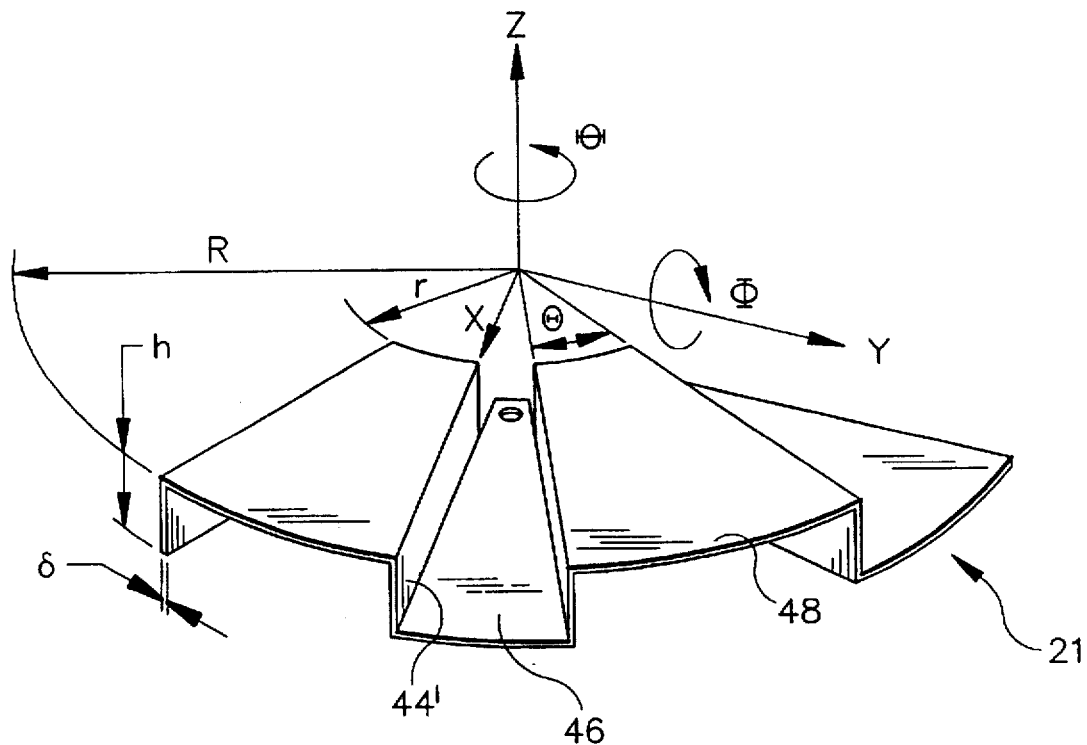
FIG. 5 illustrates a segment of the castellated damper vane with the vectors and dimensions needed to specify damping coefficients in each degree-of-freedom.

Relatively simple equations for approximating damping due to each Section of the damper vane assembly 20 have been derived. FIG. 5 illustrates the coordinate system and the physical dimensions used to calculate damping. The X axis is aligned with a vertical vane section 44', the Z axis is concentric with the axis of the polishing head, and the Y axis is perpendicular to the X-Z plane. It is obvious that the horizontal portions of the vane 46 and 48 primarily affect the X and Y translations, and Θ rotational damping. The vertical sections 44 primarily affect Z translations, and Φ rotational damping. It should be appreciated that coupling does exist between axes. Damping provided on each global axis (relative to the polishing head) is calculated by vectorially summing the local damping (for each section).

Figure 6:
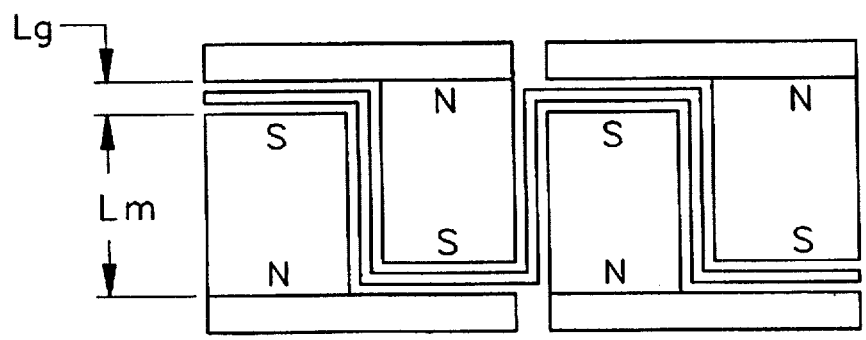
FIG. 6 is an end view of adjacent magnet pole pairs illustrating; magnet polarity, critical dimensions, and general configuration.

FIG. 6 illustrates the magnet structure dimensions necessary to determine the field in the gap for a two pole pairs. Design equations are as follows:

About the local Z axis:

$$C_\theta = 0.18 \sigma \delta B^2 (R^2 - r^2) \theta (R-r)(Kg/s \text{ rad}) \qquad \text{Eq. 1}$$

About the local Y axis:

$$C_{101} 0.27 \sigma \delta B^2 (R^2 - r^2) h (R-r)(Kg/s \text{ rad}) \qquad \text{Eq. 2}$$

Along the local X and Z axes:

$$C_x = C_z = 0.29 \sigma \delta B^2 (R^2 - r^2) h (Kg/s) \qquad \text{Eq. 3}$$

Field in gap:

$$B\ 32\ 0.7 B r L m/(Lm + Lg)(G) \qquad \text{Eq. 4}$$

Where:

δ=damper vane material thickness (m)

σ=damper vane material electrical conductivity (m/Ωm²)

θ=included angle of one horizontal damper vane section (radians)

h=height of one vertical damper vane section (m)

R=outside diameter of damper vane (m)

r=inside diameter of damper vane (m)

Br=remanence of magnet material (G)

Lm=length of one magnet (m)

Lg=size of gap (m)

These equations assume constant damper vane thickness; however, the vertical and horizontal section thicknesses may be different. From the equations it is obvious that combinations of damping can be optimized by varying magnet height, number of segments, magnet material, damper vane material, etc. A feature of this damper is that damping in each direction can often be optimized by simply modifying the damper vane.

Figure 7:
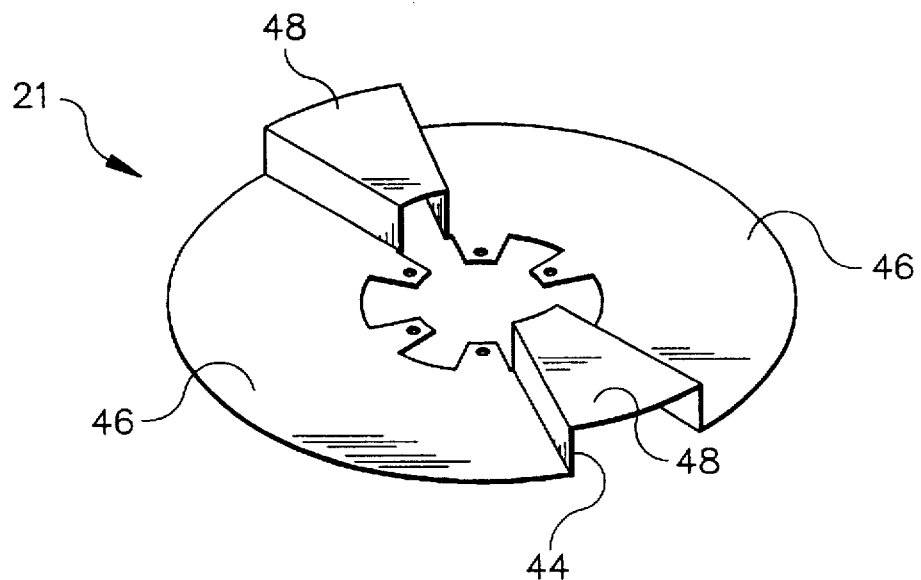
FIG. 7 is a perspective view of a second embodiment of the damper vane.

FIG. 7 illustrates an alternate embodiment for the damper vane 21 which provides primarily Θ, X, and Y direction rotational damping with slight Z and Φ tip axis damping only. In this embodiment the horizontal portions 46 of the damper vane 21 are formed much larger than the horizontal portions 48. With all of the vertical sections 44 being the same size.

Figure 8:
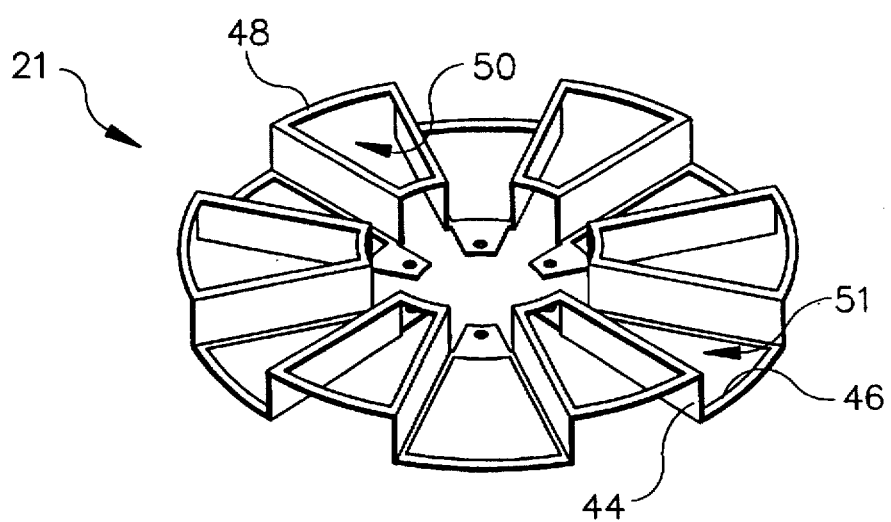
FIG. 8 is a perspective view of a third embodiment of the damper vane.

FIG. 8 illustrates another damper vane embodiment that provides only X, Y, Z, tip, and tilt damping. In this embodiment the horizontal portions 46 and 48 of the damper vane 21 are provided with openings 50 and 51, respectively, to reduce Θ damping. Again the vertical sections 44 remain the same in size.

The invention has been described with reference to preferred embodiments; However, it will be appreciated that variations and modifications can be effected by a person of ordinary skill in the art without departing from the scope of the invention.

PARTS LIST 2 damper assembly
4 lower magnet assembly mount
6 upper magnet assembly mount
8 polisher head support
10 extension shaft
12 polisher head
20 damper vane assembly
21 damper vane
22 mounting hub
23 mounting tabs
24 holes
26 lower magnet assembly
27 multiple pole assemblies
28 magnets
30 keepers
32 upper magnet assembly
33 multiple pole assemblies
34 magnets
36 keepers
37 recess
38 recess
40, 41 horizontal gap
42 vertical gap
44 vertical vane section
44' vertical vane section
46, 48 horizontal vane portion
50, 51 openings

We claim:

1. A passive magnetic damper, comprising:
   a disk shaped damper vane having spaced apart vertical and horizontal portions forming a castellated shape; and
   a plurality of magnets positioned between the vertical portions of said damper vane for providing magnetic fields for interacting with the vertical and horizontal portions of said damper vane.

2. The passive magnetic damper according to claim 1 wherein each of the plurality of magnets is comprised of:
   a permanent magnet portion positioned between the vertical portions of the damper vane; and
   a keeper portion extending from one end of a permanent magnet portion to a position over one adjacent horizontal portion of the damper vane.

3. The passive magnetic damper according to claim 1 wherein said damper vane is formed with horizontal portions of at least two different widths.

4. The passive magnetic damper according to claim 2 wherein said damper vane is formed with the horizontal portions having openings there through between an end of a permanent magnet on one side and the extended portion of a keeper connected to an end of an adjacent permanent magnet.

5. A passive magnetic damper, comprising:
   a disk shaped damper vane formed from an electrically conductive material having spaced apart vertical and horizontal portions forming a castellated shaped open centered disc;
   a non-magnetic mounting hub mounted to the open center of said damper vane, said mounting hub being mountable to one element of a device to be damped; and
   a plurality of magnets positioned between the vertical portions of said damper vane for providing magnetic fields for interacting with the vertical and horizontal portions of said damper vane said plurality of magnets being mountable to another element of the device to be damped so as to dampen the motion between the one and the other of said elements.

6. The passive magnetic damper according to claim 5 wherein each of the plurality of magnets is comprised of:
   a permanent magnet portion positioned between the vertical portions of the damper vane; and
   a keeper portion extending from one end of a permanent magnet portion to a position over one adjacent horizontal portion of the damper vane.

7. The passive magnetic damper according to claim 5 wherein said damper vane is formed with horizontal portions of at least two different widths.

8. The passive magnetic damper according to claim 5 wherein said damper vane is formed with the horizontal portions having openings there through between an end of a permanent magnet on one side and the extended portion of a keeper connected to an end of an adjacent permanent magnet.

* * * * *

UNITED STATES PATENT AND TRADEMARK OFFICE
CERTIFICATE OF CORRECTION

PATENT NO. : 5,736,798
DATED : April 7, 1998
INVENTOR(S) : Michael Joseph O'Brien, Robert Cooper Bryant, and Richard Alexander Colleluori It is certified that error appears in the above-indentified patent and that said Letters Patent is hereby corrected as shown below:

On the title page, Related U.S. Application Data:
insert --Provisional Application No. 60/005,594, October 19, 1995--.

Signed and Sealed this

Twenty-first Day of July, 1998

*Attest:*

BRUCE LEHMAN

*Attesting Officer*   *Commissioner of Patents and Trademarks*